(12) United States Patent
Journee

(10) Patent No.: US 8,142,695 B2
(45) Date of Patent: Mar. 27, 2012

(54) FOAM OF POLYMERS

(75) Inventor: Marinus Johannes Gerardus Journee, Loo (NL)

(73) Assignee: Teijin Aramid B.V., Arnhem (NL)

( * ) Notice: Subject to any disclaimer, the term of this patent is extended or adjusted under 35 U.S.C. 154(b) by 270 days.

(21) Appl. No.: 12/450,302

(22) PCT Filed: Mar. 28, 2008

(86) PCT No.: PCT/EP2008/002440
§ 371 (c)(1),
(2), (4) Date: Sep. 21, 2009

(87) PCT Pub. No.: WO2008/122373
PCT Pub. Date: Oct. 16, 2008

(65) Prior Publication Data
US 2010/0036007 A1   Feb. 11, 2010

(30) Foreign Application Priority Data
Apr. 5, 2007   (EP) ..................... 07007166

(51) Int. Cl.
| | |
|---|---|
| B29C 44/04 | (2006.01) |
| B29C 65/02 | (2006.01) |
| B29C 44/12 | (2006.01) |
| C08J 9/32 | (2006.01) |
| C08J 9/228 | (2006.01) |
| C08J 9/236 | (2006.01) |

(52) U.S. Cl. ....... 264/45.3; 264/44; 264/45.1; 264/45.4; 521/54; 521/60; 521/46; 521/82; 521/91

(58) Field of Classification Search ............... 521/50, 521/60, 76, 82, 91; 264/44, 45.1, 45.3, 45.4
See application file for complete search history.

(56) References Cited

U.S. PATENT DOCUMENTS

| | | | |
|---|---|---|---|
| 4,178,419 A | 12/1979 | Memeger, Jr. | |
| 6,107,976 A | 8/2000 | Purinton | |
| 6,476,087 B1 * | 11/2002 | De Toffol | ........................ 521/54 |
| 7,776,439 B2 * | 8/2010 | Han et al. | ..................... 428/364 |
| 2005/0256214 A1 * | 11/2005 | Smart et al. | ..................... 521/50 |

FOREIGN PATENT DOCUMENTS

| | | |
|---|---|---|
| GB | 1 522 898 | 8/1978 |
| JP | A-2001-98106 | 4/2001 |
| JP | A-2006-265468 | 10/2006 |
| WO | WO 03/078516 A1 | 9/2003 |
| WO | WO 03/085049 A1 | 10/2003 |

* cited by examiner

*Primary Examiner* — RAndy Gulakowski
*Assistant Examiner* — Kara Negrelli
(74) *Attorney, Agent, or Firm* — Oliff & Berridge, PLC

(57) ABSTRACT

The disclosure pertains to foam of polymers, which can be made by a method for making a polymer foam comprising vacuum or gas-filled compartments by making a solution of 1 to 20% by weight of a polymer in a solvent; adding particles to the a polymer solution; solidifying the polymer wherein the particles are contained by heating, cooling, ageing, or coagulating to obtain a polymer foam or matrix comprising the particles, and obtaining from the polymer matrix the polymer foam containing the compartments; and optionally washing, drying, and/or heating the polymer foam.

6 Claims, No Drawings

FOAM OF POLYMERS

The invention pertains to a method of making foam of polymers, to these foam and to shaped articles made thereof.

Aramid is a well known polymer that is commercially available as fiber, including pulp, and film. Examples of such products are on the market under trade names such as Twaron®, and Kevlar®. Aramid is also applied in composite materials together with other polymer materials. Other polymers are PBO, which is sold as Zylon®, PI PD, which is also known as M5, and co-poly-(paraphenylene/3,4'-oxydiphenylene terephthalamide which is sold as Technora®. Shaped articles can be made of such composite materials, but for many applications these have the disadvantage that they are too compact and have too much weight to useful apply. Therefore there is a need for light-weight polymer materials that can be shaped in any desirable shape. Traditionally, if low weight polymeric shaped materials are required, often foams are used, for instance for use in construction materials, in isolation materials, and in fire resistant or fire retarding materials.

In U.S. Pat. No. 4,178,419 foam materials having a density from 0.025 to 0.7 g/cm$^3$ are described. These foams are prepared using N,N'-dialkyl aromatic polyamides, which is heated to dealkylate the polyamide, forming the foam. This method has many drawbacks. Heating should be performed from 250 to 340° C. to effect dealkylation and to create the foam. In order to avoid degradation of the polymer, the heating should be for as short a time and at as low a temperature as are commensurate with obtaining a substantially dealkylated product. In practice either incompletely dealkylation or decomposition products are obtained. Particularly incomplete dealkylation can be very dangerous since such product may be excessively flammable, because of further alkene being split off under conditions of combustion. Other drawbacks are the necessity to produce N-alkylated monomers and to polymerize such monomers, whereas it is much more economic to use standard polyamide polymers. Furthermore, the density, i.e. the average size of the holes is difficult to control, and a uniform distribution of such holes is practically impossible.

In US 2005/0256214 PBO foams have been described that were made by trapping the solvent THF in the polymer matrix, followed by heating to evaporate the THF. This method has similar disadvantages as the above-mentioned U.S. Pat. No. 4,178,419, with regards to the controllability of the process and the possible presence of traces of THF, which is flammable and toxic, and therefore less preferred.

In JP 2001098106 a porous membrane has been described that was made by forming a film dispersed with fine metal oxide particles, and thereafter removing the metal oxide particles to form a porous membrane. This method was not used for making foams.

It is therefore an objective of the present invention to provide a more versatile method for making foam and foam-like materials made of any polymer, whereby the properties of the foam can easily be controlled.

To this end the invention relates to a method for making a polymer foam comprising vacuum or gas-filled compartments by
a) making a solution of 1 to 20% by weight of a polymer in a solvent;
b) adding particles to the a polymer solution;
c) solidifying the polymer wherein the particles are contained by heating, cooling, ageing, or coagulating to obtain a polymer foam or matrix comprising the particles, and obtaining from the polymer matrix the polymer foam containing the compartments; and
d) optionally washing, drying, and/or heating the polymer foam;
wherein in step b)
i) the particles are inert hollow particles, wherein the hollow part is the vacuum or gas-filled compartment to give the polymer foam; or
ii) the particles are solid particles that are insoluble in the solvent to give the polymer matrix; whereby in step c) the solid particles are removed from the polymer matrix after the heating, cooling, ageing, or coagulating by dissolving the solid particles in a second solvent wherein said solid particles are soluble and the polymer is insoluble, to give the polymer foam; or
iii) the particles are expandable particles that upon dissolution in the solvent in step b) and/or during heating in step c) release gas bubbles to give the polymer foam, wherein the polymer is selected from an aramid and a rigid rod polymer.

The polymer can be any aramid (aromatic polyamide) including aromatic hydroxy-functionalized polyamide, or a rigid rod polymer. Rigid rod polymers are aromatic polybisoxazoles and aromatic polybisimidazoles. Examples of aramid are para-aramids such as poly(p-phenylene-terephthalamide) (PPTA) which is available under the trade names Twaron® and Kevlar®, aromatic hydroxy-functionalized polyamides such as poly-4,4'-(3,3'dihydroxy)-bisphenylene-terephthalamide (OH-BPTA), co-poly-(paraphenylene/3,4'-oxydiphenylene terephthalamide, which is available under the trade name Technora®. Typical rigid rod polymers are poly(p-phenylene-benzobisoxazole) (PBO) which is available under the trade name Zylon® and poly(p-phenylene-pyridobisimadazole) (PIPD, M5).

The polymer is dissolved in a solvent. Suitable solvents can be selected, for example, from NMP/CaCl$_2$, sulfuric acid, (poly)phosphoric acid, and aqueous alkaline solutions containing a strong base (pKa>9).

When PPTA-NMP/CaCl$_2$ solutions are used the solidifying step can most easily be performed by elevated temperature, for instance between 50 and 250° C., more preferably between 80 and 120° C., followed by removing the solvent by washing with a suitable solvent. This leads to solidifying the polymer, which under certain conditions can lead to crystallized polymer. The solidifying step leads to a polymer matrix in which the compartments are already contained or which compartments can be obtained by a further process step. Another method to solidify the polymer matrix can be done by coagulation into a non-solvent (i.e. a solvent wherein the polymer is not soluble). Suitable solvents can be selected, for example, water, methanol, acetone, and aqueous acidic solutions containing an acidic having a pKa<5.

In a first embodiment the particles are inert hollow particles, which hollow part is vacuum or filled with a gas, such as oxygen, air, nitrogen, carbon dioxide and the like. Such particles can for instance be hollow glass, ceramic, or cork beads. Inert in the context of this invention means inert towards solvents used in the process. Thus other materials, such as metals are also possible, although these are usually more expensive and regularly have a higher weight. Glass particles are commercially available under trade names such as Eccosphere® (ex Trelleborg Emerson & Cuming, Inc.) and 3M™ Glass Bubbles. These are hollow glass microspheres manufactured from, e.g. sodium boron-silicate. These glass microspheres containing a hollow part become the integral material blended to the polymer, whereby the hollow part forms the compartments of the foam. Typically, the particles are beads of which at least 50% by volume has a diameter between 1 and 500 μm, preferably between 10 and 100 μm, more preferably between 40 and 70 μm. The size distribution of such glass bubbles is very narrow and can easily be selected from a large number of commercially available types.

After solidifying the polymer the glass microspheres are contained therein to give foam. Density of the foam is preferably 0.1 to 1 g/cm$^3$. More specifically densities are from 0.1 to 0.3 g/cm$^3$, but it should be borne in mind that these also depend on the wall thickness of the glass. Thicker glass (or ceramic material) leads to a higher weight and therefore higher densities. The hollow part of these microspheres can be filled by a gas, such as air, oxygen, nitrogen, carbon dioxide, or the like, or these hollow parts are vacuum. Thus when using this method differences of densities are not necessarily fully linked to the size of the compartments. This embodiment is the easiest method in terms of process simplicity.

In a second embodiment the particles are solid particles that are insoluble in the solvent. Thus when the polymer solidifies these solid particles remain in the polymer to give the polymer matrix. At this stage the polymer matrix does not yet contain compartments and is not yet foam. These solid particles in a further process step should then be dissolved in a (second) solvent, which is different from the solvent that was used for dissolving the polymer. It is important that the polymer does not dissolve in this second solvent. By using this method the foam is formed when the solid particles are washed out the polymer matrix, leaving empty compartments, which after drying and optionally heating are filled with air. Suitable solid particles are inorganic salts, such as sodium chloride, calcium chloride, sodium carbonate, sodium hydroxide, potassium hydrogen carbonate, carbohydrates such as saccharose, and the like. A very suitable second solvent is water, which at one hand is not a solvent for the polymer and at the other hand is an excellent solvent for most of the salts. Particle size of these solid particles may be the same as for the particles of the first embodiment. The solid particles can be obtained in a required and narrow size distribution by using suitable sieves. Densities of the foams are the same as above.

In a third embodiment the particles are expandable particles that are soluble or insoluble in the solvent for dissolving the polymer. Expandable particles are known, for instance Expancel® (ex Akzo Nobel), which is an expandable microsphere product. Expancel® comprises microscopic plastic particles filled with gas. When the gas is heated the pressure increases, the plastic shell softens and the microsphere volume increases more than 40 times. The unexpanded particles are added to the polymer solution, after which heating leads to expansion of the microsphere as well as to solidification of the polymer, giving a foamed product. When the unexpanded particles dissolve in the solvent, they also release gas bubbles, even when not heated. During the release of the gas bubbles the polymer, which is now a mixture of the polymer and the polymer that is used for the expandable particle, solidifies to form the foam wherein captured the small gas bubbles that were release by the expandable particles. Alternatively, also the commercially available expanded types can be used, because the polymer does not fully penetrate into the pores of these particles. Thus, although less controlled, a polymer solution comprising expanded microspheres is heated to obtain a polymer foam having compartments within the expanded particles that are contained therein. Particle size of the expanded particles may be the same as for the particles of the first embodiment. Densities of the foams are within the range as given above.

It is further possible to use the method of the invention for polymers that can be converted to other polymers. Thus for instance the method can be applied to a polymer, which in fact is a precursor of another polymer, which is formed from the starting polymer in process step d) by applying heat.

The above foams containing a non-fibrous matrix can be used for making shaped articles, including construction materials, carpet underlays, car parts, auto body filler, and the like. The foams can also be used as such, for instance as gap filler, isolation material, and the like. The shaped foams and the foams as such have excellent temperature resistant and mechanical properties, such as high flexural and shear strength, and are therefore eminently suitable for applications wherein the fire resistant properties are of importance. When shaped articles are made, it is advantageous to perform the solidifying process in a mold to directly obtain the article.

The polymer solution comprising the particles can further contain other constituents as well, such as fillers, pigments, conductive agents, fire retarders, etc. Examples of additives to the non-fibrous foam are pulp, fibers such as aramid fibers, silica, carbon, nanotubes, pigment, wood chips, ceramics, sand, and the like.

The invention is further illustrated by the following non-limitative examples.

EXAMPLE 1

After mixing 200 g of glass microspheres SI-250 (ex Emerson & Cuming Ltd.) with 750 g of PPTA in NMP/CaCl$_2$ (NMP=N-methylpyrrolidone) (21.1 wt % microspheres) at a polymer concentration of 3.6% by weight, a dough-like material was made which could be molded to any desired shape.

In this example a flat container was used which was filled with the dough-like material. The container was placed in an oven for about 1.5 hours at a temperature of 100° C. The mixture crystallizes in the form of a plate. NMP remainders were removed by washing the plate with hot water for about 24 hours. After washing the plate was dried. The process gave 226 g of a foamed plate having a foam density of 0.17 g/cm$^3$.

EXAMPLES 2-5

Similarly made as in Example 1 foams having various densities were made by mixing different concentrations of microspheres in the PPTA in NMP/CaCl$_2$ mixture of example 1. The following foams were obtained:

| example | microsphere weight % | foam density [g/cm$^3$] |
|---|---|---|
| 2 | 10.7 | 0.23 |
| 3 | 15.3 | 0.20 |
| 4 | 21.3 | 0.16 |
| 5 | 29.1 | 0.16 |

EXAMPLES 6-9

Similarly made as in Example 1 foams having microspheres of different densities in the PPTA—NMP/CaCl$_2$ mixture of example 1 were made.

These foams have the following densities

| example | type of microsphere | microsphere weight % | foam density [g/cm³] |
|---|---|---|---|
| 6 | E&C [0.25 g/cm³]* | 21.3 | 0.11 |
| 7 | 3M; K1 [0.125 g/cm³]** | 13.8 | 0.06 |
| 8 | 3M; K25V [0.25 g/cm³]** | 23.1 | 0.12 |
| 9 | 3M; K46 [0.46 g/cm³]** | 37.2 | 0.24 |

*ex Emerson & Cuming Ltd.
**ex 3M Company

EXAMPLE 10

Foam made of Technora® 6 wt % polymer solution in NMP with 3M microspheres (3M; K25V) (23.1 wt % microspheres) was made analogous to the method of example 1. However since the Technora® solution did not solidify to crystals, the mixture was poured into a mold, coagulated with water and washed to obtain a solid shaped article having a foam density of 0.12 g/cm³.

EXAMPLE 11

This example was made of 20 wt % PPTA in $H_2SO_4$ with 3M microspheres (3M; K25V). At a temperature of 90° C. 178 g of this polymer solution was mixed with 27 g of the microspheres (13.2 wt % microspheres). The mixture was poured into a mold and solidified by cooling. After coagulation the solid shaped product was washed to remove sulfuric acid. The density of this foam was 0.36 g/cm³.

EXAMPLE 12

In this example Technora® 6 wt % polymer solution in NMP was used and mixed with salt particles (NaCl). After mixing 70 g of polymer solution with 128 g of NaCl for about 10 min the mixture was pour into a mold. The mixture was coagulated and the NMP and NaCl salt were washed out to obtain foam. The foam density was 0.18 g/cm³.

EXAMPLE 13

This example was made of PPTA in NMP/$CaCl_2$ with 10 wt % Expancel® (type 095 DUX 120), while mixing the blend; the Expancel solves in de the polymer solution and releases its gas. At almost the same time the mixture solidified in the form of crystals caused by the solving Expancel. After coagulation the solid shape was washed. The density of this foam was 0.28 g/cm³.

The invention claimed is:

1. A method for making a polymer foam comprising vacuum or gas-filled compartments by
    a) making a solution of 1 to 20% by weight of a polymer in NMP/$CaCl_2$ or sulfuric acid;
    b) adding particles to the polymer solution; and
    c) solidifying the polymer wherein the particles are contained by heating, cooling, ageing, or coagulating to obtain a polymer foam or matrix comprising the particles, and obtaining from the polymer matrix the polymer foam containing the compartments; wherein in step b)
        i) the particles are inert hollow particles, wherein the hollow part is the vacuum or gas-filled compartment to give the polymer foam; or
        ii) the particles are solid particles that are insoluble in the NMP/$CaCl_2$ or sulfuric acid to give the polymer matrix; whereby in step c) the solid particles are removed from the polymer matrix after the heating, cooling, ageing, or coagulating by dissolving the solid particles in a second solvent wherein said solid particles are soluble and the polymer is insoluble, to give the polymer foam; or
        iii) the particles are expandable particles that upon dissolution in the NMP/$CaCl_2$ or sulfuric acid in step b) and/or during heating in step c) release gas bubbles to give the polymer foam, wherein the polymer is selected from an aramid.

2. The method according to claim 1 wherein the polymer is selected from poly(p-phenylene-terephthalamide), poly-4,4'-(3,3'-dihydroxy)-bisphenylene-therephthalamide, and co-poly-(paraphenylene/3,4'-oxydiphenylene terephthalamide.

3. The method according to claim 1 wherein the particles are inert hollow particles wherein the inert material is glass or a ceramic material; or the particles are solid particles, wherein the solid is an inorganic salt and the second solvent is water.

4. The method according to claim 3 wherein the particle is an inert hollow particle of glass or of a ceramic material, wherein the hollow part is filled with gas.

5. The method according to claim 1 wherein the particles are beads of which at least 50% by volume has a diameter between 1 and 500 µm.

6. The method according to claim 1 wherein the solidifying step c) is performed in a mold.

* * * * *